(12) United States Patent
Vadlamani et al.

(10) Patent No.: US 12,449,877 B1
(45) Date of Patent: Oct. 21, 2025

(54) APPARATUS, SYSTEM, AND METHOD FOR PROTECTING POWER SUPPLY UNITS FROM DAMAGE BY LIMITING INRUSH CURRENT

(71) Applicant: Juniper Networks, Inc., Sunnyvale, CA (US)

(72) Inventors: Siri Subrahmanyam Vadlamani, Konaseema District (IN); Prakash B. Kamanuri, Thane (IN); Jaspal S. Gill, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 18/359,475

(22) Filed: Jul. 26, 2023

(51) Int. Cl.
*G06F 1/30* (2006.01)
*H02M 1/42* (2007.01)
*H02M 1/44* (2007.01)
*H02M 7/06* (2006.01)

(52) U.S. Cl.
CPC .......... *G06F 1/305* (2013.01); *H02M 1/4208* (2013.01); *H02M 1/44* (2013.01); *H02M 7/06* (2013.01)

(58) Field of Classification Search
CPC ....... G06F 1/305; H02M 1/4208; H02M 1/44; H02M 7/06
See application file for complete search history.

(56) References Cited

U.S. PATENT DOCUMENTS

| 5,715,154 A * | 2/1998 | Rault .................. H02M 1/4225 323/908 |
| 2006/0274468 A1 * | 12/2006 | Phadke .................. H02H 9/001 361/93.1 |
| 2025/0023447 A1 * | 1/2025 | Chiang .................. H02M 1/007 |

FOREIGN PATENT DOCUMENTS

EP 3618250 B1 * 2/2021 ............... G05F 1/70

* cited by examiner

Primary Examiner — Zahid Choudhury
(74) Attorney, Agent, or Firm — Greenberg Traurig, LLP

(57) ABSTRACT

A disclosed apparatus may protect power supply units (PSUs) from damage by limiting inrush current. For example, an apparatus may include a PSU and a controller. In one example, the PSU may be configured to convert power from an AC input into a DC output and to provide the DC output to a computing device. In this example, the controller may be configured to limit inrush current originating from the AC input by cycling at least one switch included in the PSU until a DC bulk voltage of the PSU reaches a certain threshold. Various other apparatuses, systems, and methods are also disclosed.

17 Claims, 8 Drawing Sheets

APPARATUS, SYSTEM, AND METHOD FOR PROTECTING POWER SUPPLY UNITS FROM DAMAGE BY LIMITING INRUSH CURRENT

BACKGROUND

Power supply units (PSUs) are often used to convert and/or transform alternating current (AC) power to direct current (DC) power for consumption by computing devices. Such PSUs may experience occasional AC interruptions during operation. Unfortunately, if the PSUs' temperatures rise to a certain level during operation, such AC interruptions may expose the PSUs to potential damage from inrush current.

For example, a PSU's integral resistance may decrease due to rising temperature and the negative temperature coefficient (NTC) of certain materials incorporated in the PSU. In this example, if the PSU's temperature rises to a certain level prior to one or more AC interruptions, the PSU's decreased NTC-dependent resistance may be unable to limit the inrush current that ensues as the AC power recovers from the interruption(s). Such inrush current may exceed the absolute maximum ratings of certain components (e.g., diodes, rectifiers, capacitors, fuses, etc.) incorporated in the PSU, thereby potentially damaging, wounding, and/or compromising these components and/or the PSU as a whole.

The instant disclosure, therefore, identifies and addresses a need for additional apparatuses, systems, and methods for protecting PSUs from damage by limiting inrush current.

SUMMARY

As will be described in greater detail below, the instant disclosure generally relates to apparatuses, systems, and methods for protecting PSUs from damage by limiting inrush current. In some examples, an apparatus for accomplishing such a task may include and/or represent a PSU and a controller. In one example, the PSU may be configured to convert power from an AC input into a DC output and to provide the DC output to a computing device. In this example, the controller may be configured to limit inrush current originating from the AC input by cycling at least one switch included in the PSU until a DC bulk voltage of the PSU reaches a certain threshold.

Similarly, a corresponding system may include and/or represent a computing device, a PSU, and a controller. In some examples, the PSU may be configured to convert power from an AC input into a DC output and to provide the DC output to the computing device. In such examples, the controller may be configured to limit inrush current originating from the AC input by cycling at least one switch included in the PSU until a DC bulk voltage of the PSU reaches a certain threshold.

Additionally or alternatively, a corresponding method may include and/or involve (1) detecting, by a controller, a zero-crossing of an AC input electrically coupled to a PSU configured to provide a DC output to a computing device and (2) limiting, by the controller, inrush current originating from the AC input by (A) cycling at least one switch included in the PSU until a DC bulk voltage of the PSU reaches a certain threshold and (B) increasing a duty cycle of the at least one switch while cycling the at least one switch.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
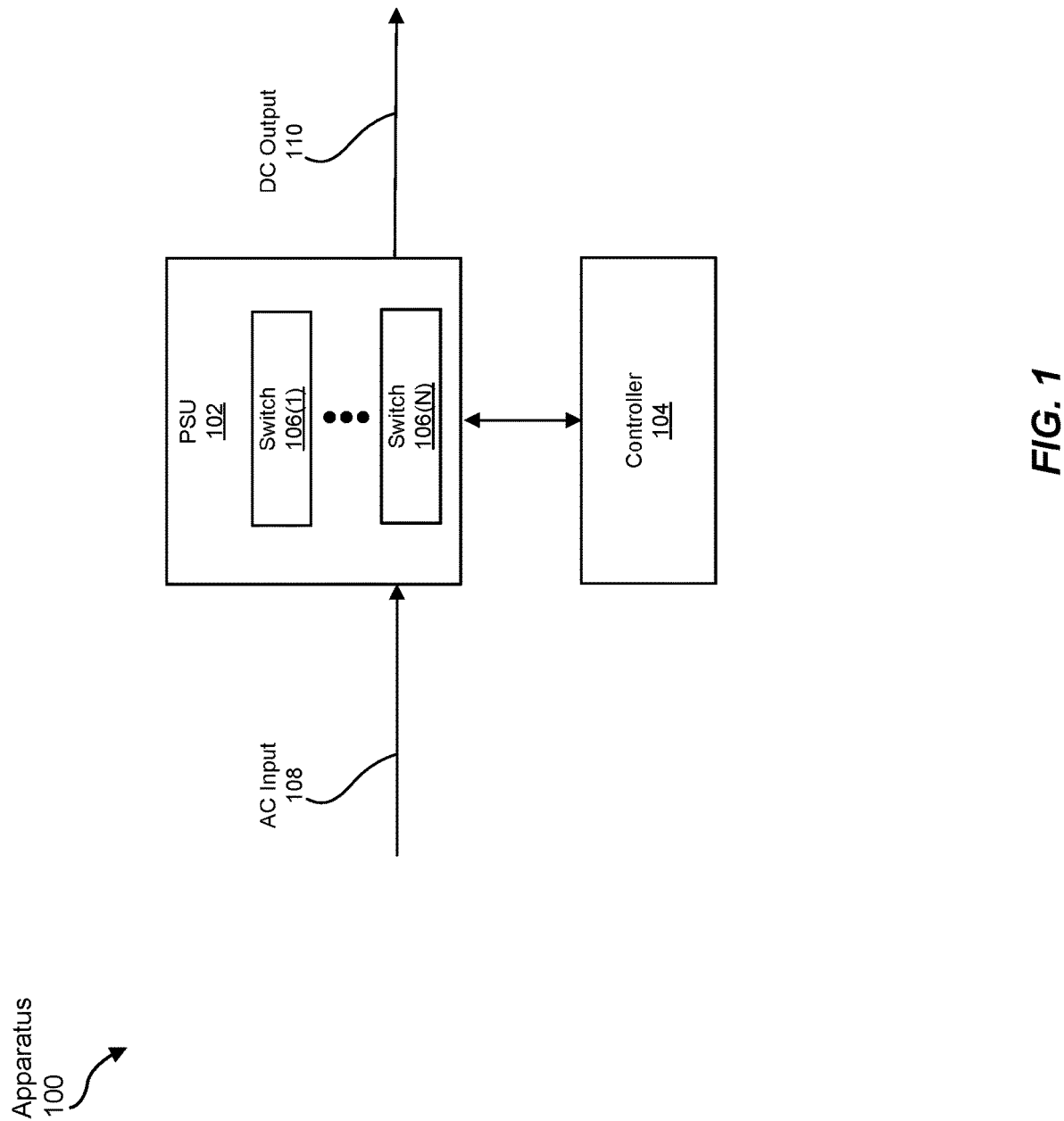
FIG. 1 is a block diagram of an exemplary apparatus capable of protecting PSUs from damage by limiting inrush current according to one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for protecting PSUs from damage by limiting inrush current. As will be explained in greater detail below, embodiments of the present disclosure may include and/or involve a PSU that converts power from an AC input into a DC output. In some examples, the PSU may provide and/or feed the DC output to one or more computing devices (e.g., a router or switch). In one example, the PSU may be communicatively and/or electrically coupled to a controller. In this example, the controller may protect components of the PSU (e.g., diodes, rectifiers, capacitors, fuses, etc.) from damage by limiting inrush current originating from the AC input. The controller may limit, regulate, and/or mitigate the inrush current by cycling one or more electrical switches (e.g., one or more transistors) included in the PSU until a DC bulk voltage of the PSU reaches a certain threshold.

As a specific example, the AC input from which the PSU draws power may experience frequent interruptions and/or disruptions. In this example, the interruptions and/or disruptions may cause the PSU to lose a certain amount of charge that needs to be replenished to resume operation once the AC power returns. Prior to the interruptions and/or disruptions, operation of the PSU may cause its internal temperature to rise. This rise in the PSU's temperature may effectively decrease and/or reduce the PSU's integral resistance due at least in part to the NTC of certain materials incorporated in the PSU. In view of this decreased NTC-dependent resistance, the controller may apply and/or implement an algorithm and/or feature that protects the components of the PSU from damage caused by the inrush current when the AC power returns.

In one example, the algorithm and/or feature implemented by the controller may include and/or involve cycling an electrical switch included in the PSU with increasing duty cycles until the DC bulk voltage of the PSU is commensurate with the peak voltage of the AC input. For example, the controller may monitor the AC input for zero-crossings. In this example, upon detecting a zero-crossing in the AC input after an AC interruption, the controller may activate and/or close the electrical switch for a certain amount of time to enable current from the AC input to charge the bulk capacitor of the PSU via a low-dropout (LDO) voltage regulator. Upon completion of that amount of time, the controller may deactivate and/or open the electrical switch to effectively stop and/or prevent current from the AC input from charging the bulk capacitor of the PSU via the LDO voltage regulator.

In some examples, the voltage level across the bulk capacitor may correspond to and/or control the DC bulk voltage. In one example, the DC bulk voltage may be stepped down via additional circuitry to provide a stable DC output from the PSU. Accordingly, the DC bulk voltage may constitute and/or represent a higher voltage level than the DC output of the PSU.

In one example, the process of cycling (e.g., activating and/or deactivating) the electrical switch may continue until the DC bulk voltage is restored to a voltage level commensurate with the peak voltage of the AC input. After reaching that voltage level, the cycling of the electrical switch may cease, but the voltage level of the DC bulk voltage may continue to rise even further. the For example, the controller may direct and/or cause the electrical switch to maintain and/or produce a first duty cycle (e.g., $Time_{ON}$=0.2 milliseconds, $Time_{OFF}$=9.8 milliseconds) for a certain number of cycles (e.g., 5 cycles). In this example, upon completion of that number of cycles, the controller may direct and/or cause the electrical switch to maintain and/or produce a second duty cycle (e.g., $Time_{ON}$=0.3 milliseconds, $Time_{OFF}$=9.7 milliseconds) for a certain number of cycles (e.g., 5 cycles). Then, upon completion of that number of cycles, the controller may direct and/or cause the electrical switch to maintain and/or produce a third duty cycle (e.g., $Time_{ON}$=0.4 milliseconds, $Time_{OFF}$=9.6 milliseconds) for a certain number of cycles (e.g., 4 cycles). Accordingly, the controller may increase and/or modify the duty cycles of the electrical switch as the bulk capacitor of the PSU recharges and/or regenerates to the point at which its voltage level becomes commensurate with the peak voltage of the AC input.

By slowly increasing the duty cycle of the electrical switch in this way, the controller may be able to limit and/or regulate the inrush current passing through the PSU when the AC input recovers from an interruption. Additionally or alternatively, by limiting and/or regulating the inrush current in this way, the controller may protect the components of the PSU from being damaged, wounded, and/or compromised by the inrush current (which potentially exceeds the components' absolute maximum ratings), thereby prolonging the lifespan of and/or preserving the PSU. Moreover, the various apparatuses, systems, and methods disclosed herein may be field-programmable and/or field-configurable to accommodate certain features and/or nuances of a given environment.

The following will provide, with reference to FIGS. 1-7 detailed descriptions of exemplary apparatuses, systems, components, and corresponding implementations for protecting PSUs from damage by limiting inrush current. Detailed descriptions of computer-implemented methods for protecting PSUs from damage by limiting inrush current will be provided in connection with FIG. 8.

FIG. 1 illustrates an exemplary apparatus 100 capable of protecting PSUs from damage by limiting inrush current. In some examples, apparatus 100 may include and/or represent a PSU 102 and a controller 104. In such examples, controller 104 may be electrically and/or communicatively coupled to PSU 102. For example, controller 104 and PSU 102 may communicate with one another via an inter-integrated circuit ($I^2C$) bus, a serial peripheral interface (SPI) bus, and/or the like. In one example, PSU 102 may be configured and/or arranged to convert and/or transform power from an AC input 108 into a DC output 110. In this example, PSU 102 may be configured and/or arranged to provide and/or deliver DC output 110 to a computing device for consumption and/or use. In certain implementations, AC input 108 may be electrically coupled to an AC power source.

In some examples, PSU 102 may include and/or represent one or more switches 106(1)-(N) whose configurations and/or applications vary depending on whether normal-operation mode or inrush-protection mode is implemented by controller 104. In one example, controller 104 may implement and/or apply normal-operation mode during normal operation of PSU 102 (e.g., after a bulk capacitor of PSU 102 has reached a voltage level commensurate with the peak voltage of AC input 108). Additionally or alternatively, controller 104 may implement and/or apply inrush-protection mode after AC input 108 experiences an interruption and/or disruption during which an insufficient amount of AC power is delivered, provided, and/or fed to PSU 102 via AC input 108.

In some examples, controller 104 may detect AC interruptions and/or disruptions by monitoring the power delivery and/or current levels of AC input 108. Additionally or alternatively, controller 104 may detect AC interruptions and/or disruptions by monitoring the DC bulk voltage across the bulk capacitor. In such examples, controller 104 may change, switch, and/or shift from normal-operation mode to inrush-protection mode in response to detecting an AC interruption and/or disruption in AC input 108. In one example, switches 106(1)-(N) may be individually and/or collectively activated and/or closed by controller 104. Additionally or alternatively, switches 106(1)-(N) may be individually and/or collectively deactivated and/or opened by controller 104.

In one example, inrush-protection mode may facilitate, allow, and/or involve the transfer of electric current from AC input 108 to the bulk capacitor of PSU 102 via an LDO voltage regulator (not necessarily illustrated and/or labeled in FIG. 1) in short step-wise bursts. In this example, normal-operation mode may stop, prevent, and/or avert the transfer of electric current from AC input 108 to the bulk capacitor of PSU 102 via the LDO voltage regulator. Instead, once the bulk capacitor of PSU 102 is recharged, normal-operation mode may facilitate, allow, and/or involve the transfer of electric current from AC input 108 to the bulk capacitor via a flyback converter.

In some examples, electric current may traverse and/or travel from AC input 108 to the bulk capacitor of PSU 102 via different pathways that are selectively combined and/or logically OR-ed in PSU 102—depending on which mode is implemented by controller 104. For example, when inrush-protection mode is implemented, controller 104 may configure and/or program PSU 102 to direct electric current to pass from AC input 108 to the bulk capacitor in step-wise bursts and/or cycles via the LDO voltage regulator. In this example, when normal-operation mode is implemented (e.g., after inrush-protection mode terminates), controller 104 may configure and/or program PSU 102 to direct electric current to pass from AC input 108 to the bulk capacitor via the flyback converter.

In some examples, when inrush-protection mode is implemented, controller 104 may limit and/or regulate inrush current originating from AC input 108 by cycling switch 106(1) until the DC bulk voltage reaches and/or satisfies a certain threshold (e.g., the peak voltage of AC input 108). For example, controller 104 may cycle switch 106(1) by alternating switch 106(1) between periods and/or phases of activation and/or deactivation until the DC bulk voltage reaches a voltage level commensurate with the peak voltage of AC input 108. In this example, during such periods and/or phases of activation and/or deactivation, the bulk capacitor may recharge and/or regenerate to the point at which its voltage level becomes commensurate with and/or substantially equal to the peak voltage of AC input 108.

By cycling switch 106(1) in this way, controller 104 may limit and/or regulate inrush current originating from AC input 108 after detecting one or more AC interruptions. Moreover, by limiting and/or regulating inrush current in this way, controller 104 protect certain components of PSU 102 (e.g., diodes, rectifiers, capacitors, fuses, etc.) from damage.

In some examples, while cycling switch 106(1) in this way, controller 104 may slowly and/or incrementally increase the duty cycles of switches 106(1)-(N). For example, controller 104 may monitor AC input 108 for zero-crossings (e.g., points at which the AC power signal passes and/or crosses the 0-volt threshold). In this example, while monitoring AC input 108 in this way, controller 104 may detect and/or identify a zero-crossing (whether a positive or negative zero-crossing) in AC input 108. In response to detecting and/or identifying this zero-crossing, controller 104 may activate and/or close switch 106(1) for a certain amount of time to enable current from AC input 108 to charge the bulk capacitor of PSU 102 via the LDO voltage regulator. Upon completion of that amount of time, controller 104 may deactivate and/or open switch 106(1) to effectively stop and/or prevent current from AC input 108 from charging the bulk capacitor of PSU 102 via the LDO voltage regulator. This sequence of activation and deactivation may constitute and/or represent a single cycle of switch 106(1).

Subsequently, while continuing to monitor AC input 108, controller 104 may detect and/or identify another zero-crossing (whether a positive or negative zero-crossing) in AC input 108. In response to detecting and/or identifying this other zero-crossing, controller 104 may activate and/or close switch 106(1) for a certain amount of time to enable current from AC input 108 to charge the bulk capacitor of PSU 102 via the LDO voltage regulator. Upon completion of that amount of time, controller 104 may deactivate and/or open switch 106(1) to effectively stop and/or prevent current from AC input 108 from charging the bulk capacitor of PSU 102 via the LDO voltage regulator. This subsequent sequence of activation and deactivation may constitute and/or represent another cycle of switch 106(1).

In some examples, the process of cycling (e.g., activating and/or deactivating) switch 106(1) may continue until the DC bulk voltage is restored to a voltage level commensurate with the peak voltage of AC input 108. For example, controller 104 may direct and/or cause switch 106(1) to maintain and/or produce a first duty cycle (e.g., $Time_{ON}$=0.2 milliseconds, $Time_{OFF}$=9.8 milliseconds) for a certain number of cycles (e.g., 6 cycles). In this example, upon completion of that number of cycles, controller 104 may direct and/or cause the switches 106(1)-(N) to maintain and/or produce a second duty cycle (e.g., $Time_{ON}$=0.3 milliseconds, $Time_{OFF}$=9.7 milliseconds) for a certain number of cycles (e.g., 5 cycles).

Then, upon completion of that number of cycles, controller 104 may direct and/or cause switch 106(1) maintain and/or produce a third duty cycle (e.g., $Time_{ON}$=0.4 milliseconds, $Time_{OFF}$=9.6 milliseconds) for a certain number of cycles (e.g., 5 cycles). Accordingly, controller 104 may increase and/or raise the duty cycles of switches 106(1)-(N) as the bulk capacitor of PSU 102 recharges and/or regenerates to the point at which its voltage level becomes commensurate with the peak voltage of AC input 108.

In some examples, controller 104 may monitor the DC bulk voltage (e.g., the voltage level across the bulk capacitor) and then compare the same against a certain threshold (e.g., the peak voltage of AC input 108). In one example, while inrush-protection mode is implemented, controller 104 may detect that the DC bulk voltage has reached and/or risen to a voltage level commensurate with the peak voltage of AC input 108. In response to this detection, controller 104 may change, switch, and/or shift from inrush-protection mode back to normal-operation mode.

In some examples, the change and/or shift back to normal-operation mode may include and/or involve controller 104 discontinuing the cycling of switch 106(1) and/or activating switch 106(1) indefinitely. Additionally or alternatively, the change and/or shift back to normal-operation mode may include and/or involve controller 104 deactivating and/or disabling the LDO voltage regulator and/or directing or configuring PSU 102 to draw electric current for the bulk capacitor and/or DC output 110 from the flyback converter. In one example, by directing or configuring PSU 102 to draw electric current from the flyback converter in this way, controller 104 may cause PSU 102 to avoid drawing electric current for the bulk capacitor and/or DC output 110 from the LDO voltage regulator in normal-operation mode.

In some examples, PSU 102 may include and/or represent one or more physical devices and/or circuits capable of converting and/or transforming AC power into DC power. For example, PSU 102 may convert and/or transform mains AC electricity (e.g., 120-volt or 230-volt AC power) from the power grid into lower-voltage DC power (e.g., 12-volt or 54-volt DC power) sufficient to energize, operate, and/or run the computing device. In this example, PSU 102 may supply, provide, and/or deliver the DC power to the computing device. In certain implementations, PSU 102 may include and/or be equipped with a cord that is plugged into a power outlet and/or generator. In such implementations, when their cords are plugged into a power outlet and/or generator in this way, PSU 102 may be able to draw AC power from the power outlet and/or generator, convert that AC power to DC power, and then deliver that DC power to the computing device.

In some examples, controller 104 may include and/or represent one or more hardware-implemented processors, compute modules, and/or control logic capable of interpreting and/or executing computer-readable instructions. Additionally or alternatively, controller 104 may include and/or represent any type or form of circuitry that processes, converts, and/or transforms input, data, or signals in one way or another. In one example, controller 104 may include and/or represent multiple circuits distributed across apparatus 100 and/or throughout a larger computing system. Examples of controller 104 include, without limitation, physical processors, central processing units (CPUs), microprocessors, microcontrollers, field-programmable gate arrays (FPGAs), application-specific integrated circuits (ASICs), systems on chips (SoCs), control logic, parallel accelerated processors, tensor cores, integrated circuits, chiplets, portions of one or more of the same, variations or combinations of one or more of the same, and/or any other suitable controller.

Controller 104 may represent part of and/or be incorporated into various devices and/or locations of a larger computing system. For example, controller 104 may represent part of and/or be incorporated into the computing device that is powered by PSU 102 via DC output 110. In this example, controller 104 may also perform various tasks described herein on behalf of and/or in connection with the computing device. In another example, although not necessarily illustrated in this way in FIG. 1, controller 104 may represent part of and/or be incorporated into PSU 102. In a further example, controller 104 may constitute and/or represent standalone circuitry and/or a separate device that is distinct from but associated with PSU 102 and/or the computing device.

Figure 2:
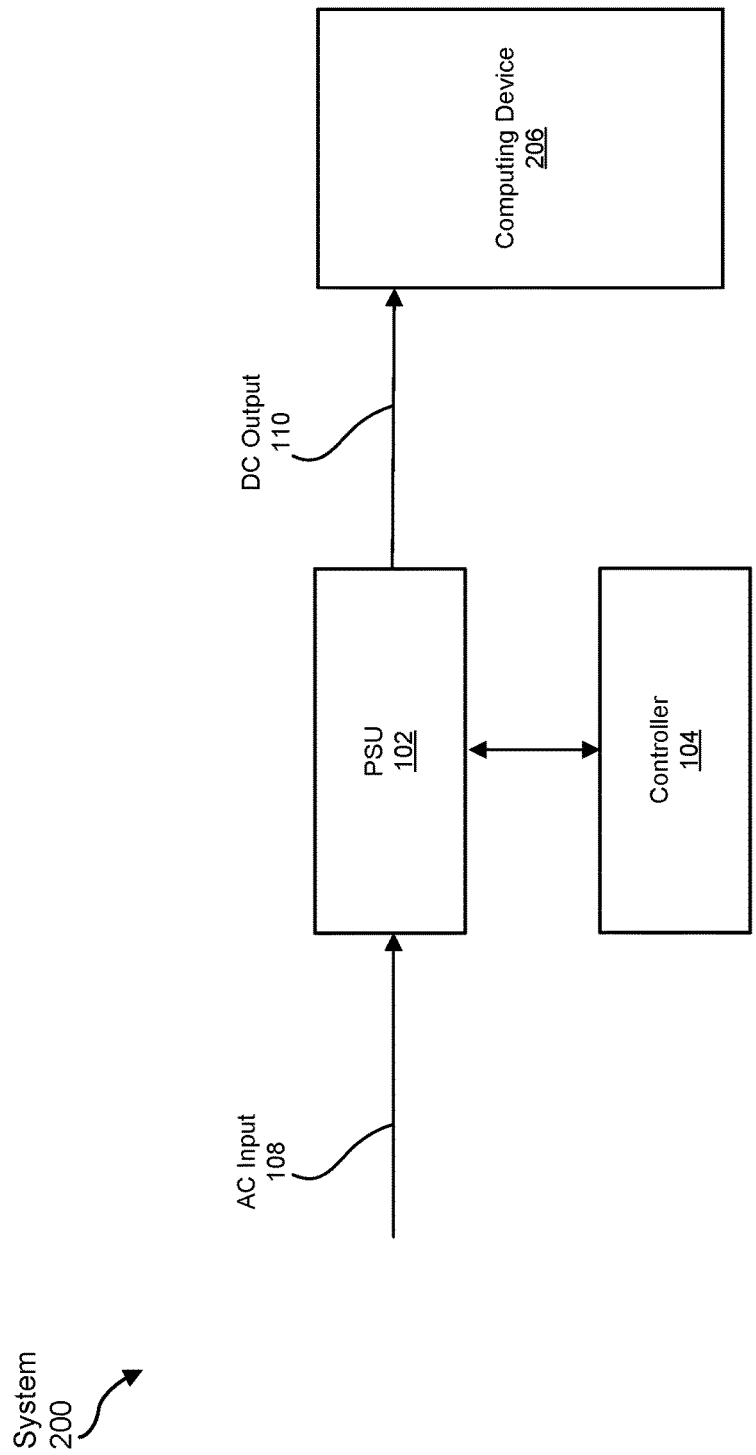
FIG. 2 is a block diagram of an exemplary system capable of protecting PSUs from damage by limiting inrush current according to one or more embodiments of this disclosure.

Exemplary apparatus 100 in FIG. 1 may be implemented in a variety of ways. For example, all or a portion of exemplary apparatus 100 may include and/or represent portions of an exemplary system 200 in FIG. 2 capable of protecting PSUs from damage by limiting inrush current. In some examples, system 200 may include and/or represent certain components, configurations, and/or features that perform and/or provide functionalities that are similar and/or identical to those described above in connection with FIG. 1. As illustrated in FIG. 2, system 200 may include and/or represent PSU 102, controller 104, and/or a computing device 206. In one example, computing device 206 may be electrically coupled to PSU 102 via DC output 110. Additionally or alternatively, computing device 206 may be communicatively coupled to PSU 102 and/or controller 104.

In some examples, computing device 206 may include and/or represent a physical device and/or system capable of reading computer-executable instructions, handling network traffic, and/or communicating with remote devices. In one example, computing device 206 may include and/or represent a network device that facilitates and/or supports the flow of traffic within a network and/or across networks. Additional examples of computing device 206 include, without limitation, routers (such as a transit label switching router, a label edge router, a provider edge router, a hub router, a spoke router, an autonomous system boundary router, and/or an area border router), switches, hubs, modems, bridges, repeaters, gateways (such as broadband network gateways), multiplexers, network adapters, network interfaces, linecards, collectors, client devices, laptops, tablets, desktops, servers, cellular phones, gaming consoles, portions of one or more of the same, variations or combinations of one or more of the same, and/or any other suitable computing device.

Figure 3:
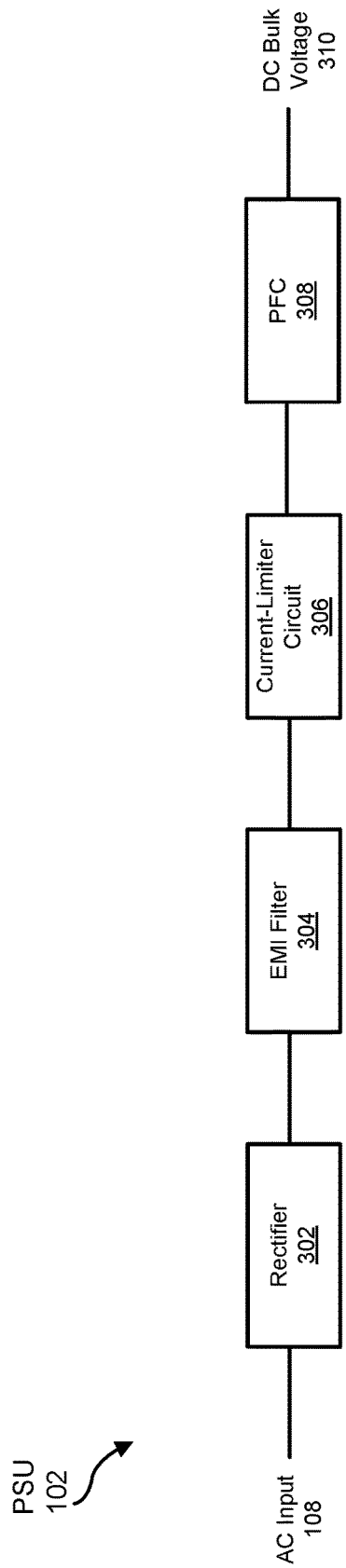
FIG. 3 is a block diagram of an exemplary PSU capable of limiting inrush current according to one or more embodiments of this disclosure.

FIG. 3 illustrates a portion of an exemplary implementation of PSU 102 capable of limiting inrush current in conjunction with controller 104. In some examples, PSU 102 in FIG. 3 may include and/or represent certain components, configurations, and/or features that perform and/or provide functionalities that are similar and/or identical to those described above in connection with either FIG. 1 or FIG. 2. As illustrated in FIG. 3, exemplary PSU 102 may include and/or represent a rectifier 302, an electromagnetic interference (EMI) filter 304, a current-limiter circuit 306, and/or a power factor correction (PFC) 308.

In some examples, at least one terminal of rectifier 302 may be electrically coupled to AC input 108, and at least one other terminal of rectifier 302 may be electrically coupled to EMI filter 304. In one example, at least one terminal of EMI filter 304 may be electrically coupled to rectifier 302, and at least one other terminal of EMI filter 304 may be electrically coupled to current-limiter circuit 306. In this example, at least one terminal of current-limiter circuit 306 may be electrically coupled to EMI filter 304, and at least one other terminal of current-limiter circuit 306 may be electrically coupled to PFC 308. Additionally or alternatively, at least one terminal of PFC 308 may be electrically coupled to current-limiter circuit 306, and at least one other terminal of PFC 308 may output and/or be electrically coupled to a DC bulk voltage 310.

Figure 4:
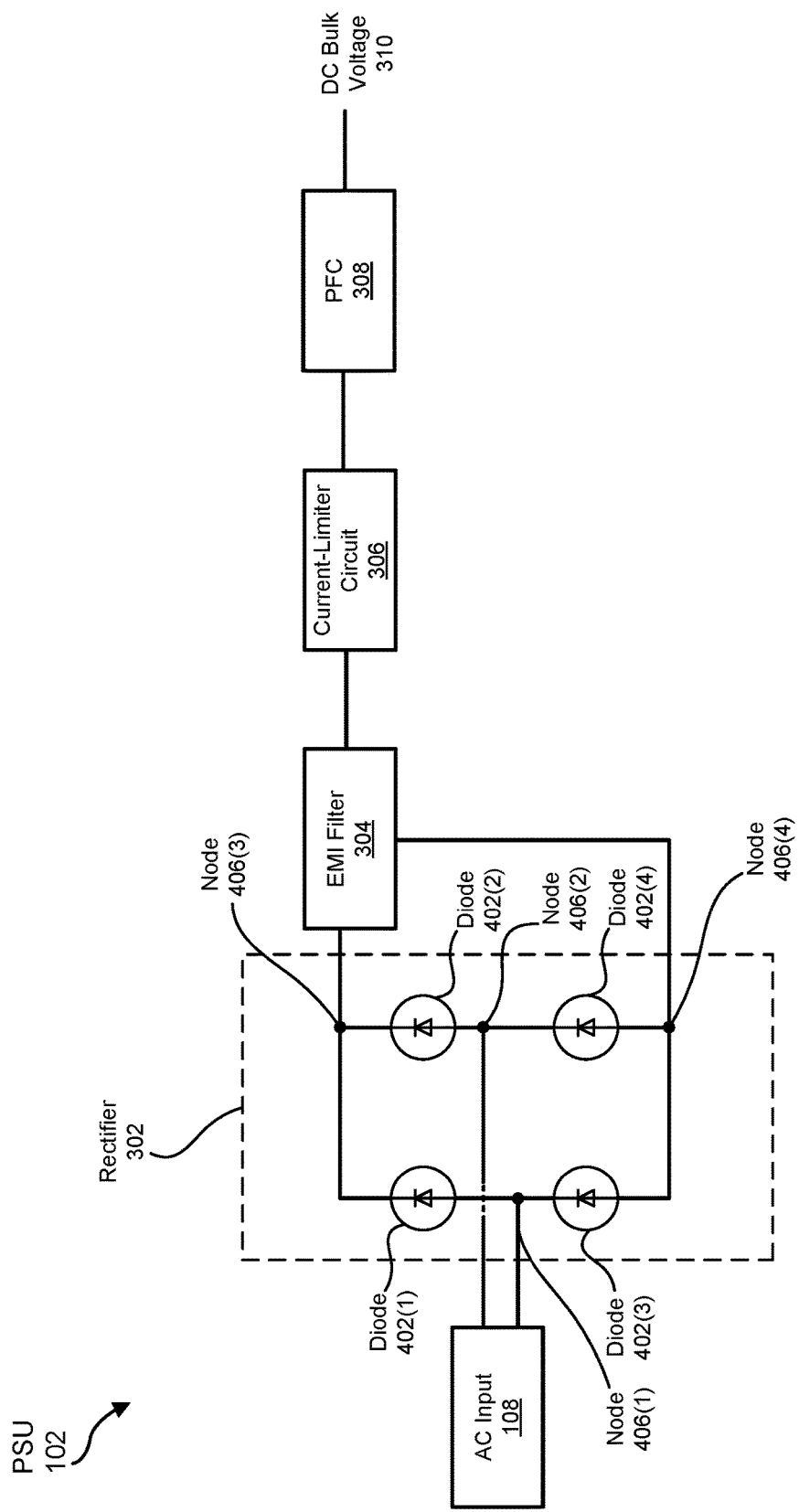
FIG. 4 is a block diagram of an exemplary PSU capable of limiting inrush current according to one or more embodiments of this disclosure.

FIG. 4 illustrates a portion of an exemplary implementation of PSU 102 capable of limiting inrush current in conjunction with controller 104. In some examples, PSU 102 in FIG. 4 may include and/or represent certain components, configurations, and/or features that perform and/or provide functionalities that are similar and/or identical to those described above in connection with any of FIGS. 1-3. As illustrated in FIG. 4, exemplary PSU 102 may include and/or represent rectifier 302, EMI filter 304, current-limiter circuit 306, and/or PFC 308.

In some examples, rectifier 302 may include and/or represent a diode-bridge circuit that rectifies electric current delivered and/or fed to PSU 102 via AC input 108 into a single polarity. In such examples, rectifier 302 may provide and/or output a rectified derivative of AC input 108 to EMI filter 304. In one example, rectifier 302 may include and/or represent diodes 402(1), 402(2), 402(3), and 402(4). In this example, diodes 402(1) and 402(3) may be electrically coupled to one another at a node 406(1), and diodes 402(2) and 402(4) may be electrically coupled to a node 406(2). Additionally or alternatively, one terminal of AC input 108 may be electrically coupled to node 406(1) between diodes 402(1) and 402(3), and another terminal of AC input 108 may be electrically coupled to node 406(2) between diodes 402(2) and 402(4).

In some examples, diodes 402(1) and 402(2) may be electrically coupled to one another at node 406(3), and diodes 402(3) and 402(4) may be electrically coupled to one another at node 406(4). Additionally or alternatively, one terminal of EMI filter 304 may be electrically coupled to node 406(3) at which diodes 402(1) and 402(2) are joined, and another terminal of EMI filter 304 may be electrically coupled to node 406(4) at which diodes 402(3) and 402(4) are joined.

Figure 5:
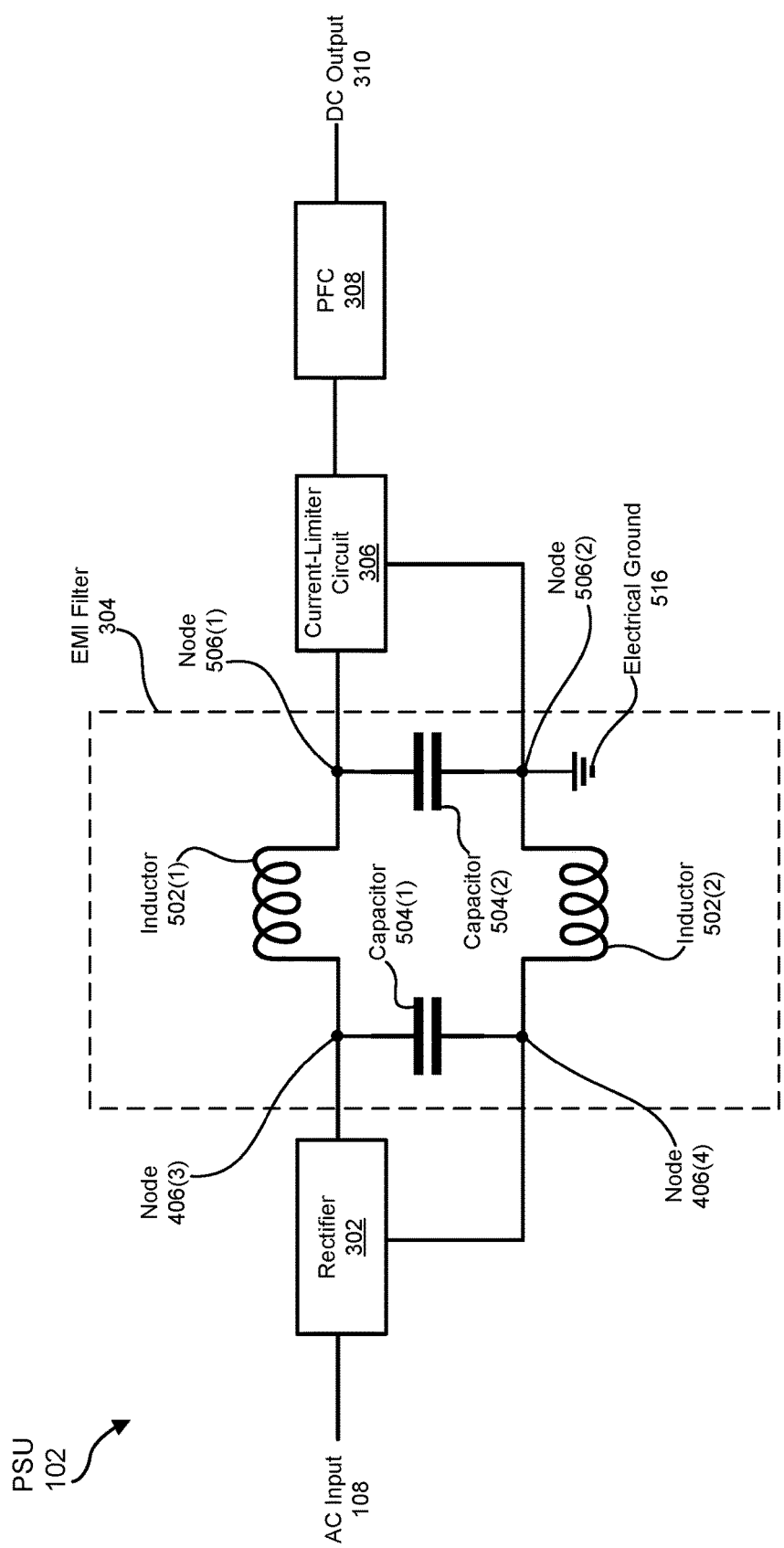
FIG. 5 is a block diagram of an exemplary PSU capable of limiting inrush current according to one or more embodiments of this disclosure.

FIG. 5 illustrates a portion of an exemplary implementation of PSU 102 capable of limiting inrush current in conjunction with controller 104. In some examples, PSU 102 in FIG. 5 may include and/or represent certain components, configurations, and/or features that perform and/or provide functionalities that are similar and/or identical to those described above in connection with any of FIGS. 1-4.

As illustrated in FIG. 5, exemplary PSU 102 may include and/or represent rectifier 302, EMI filter 304, current-limiter circuit 306, and/or PFC 308.

In some examples, EMI filter 304 may include and/or represent inductors 502(1) and 502(2) and/or capacitors 504(1) and 504(2). In one example, one terminal of inductor 502(1) may be electrically coupled to one terminal of capacitor 504(1) at node 406(3), and another terminal of inductor 502(1) may be electrically coupled to one terminal of capacitor 504(2) at a node 506(1). In this example, one terminal of inductor 502(2) may be electrically coupled to another terminal of capacitor 504(1) at node 406(4), and another terminal of inductor 502(2) may be electrically coupled to another terminal of capacitor 504(2) at a node 506(2).

In some examples, node 506(2) may constitute and/or represent an electrical ground 516 of PSU 102. In one example, one terminal of current-limiter circuit 306 may be electrically coupled to node 506(1) at which inductor 502(1) and capacitor 504(2) are joined, and another terminal of current-limiter circuit 306 may be electrically coupled to node 506(2) at which inductor 502(2) and capacitor 504(2) are joined.

Figure 6:
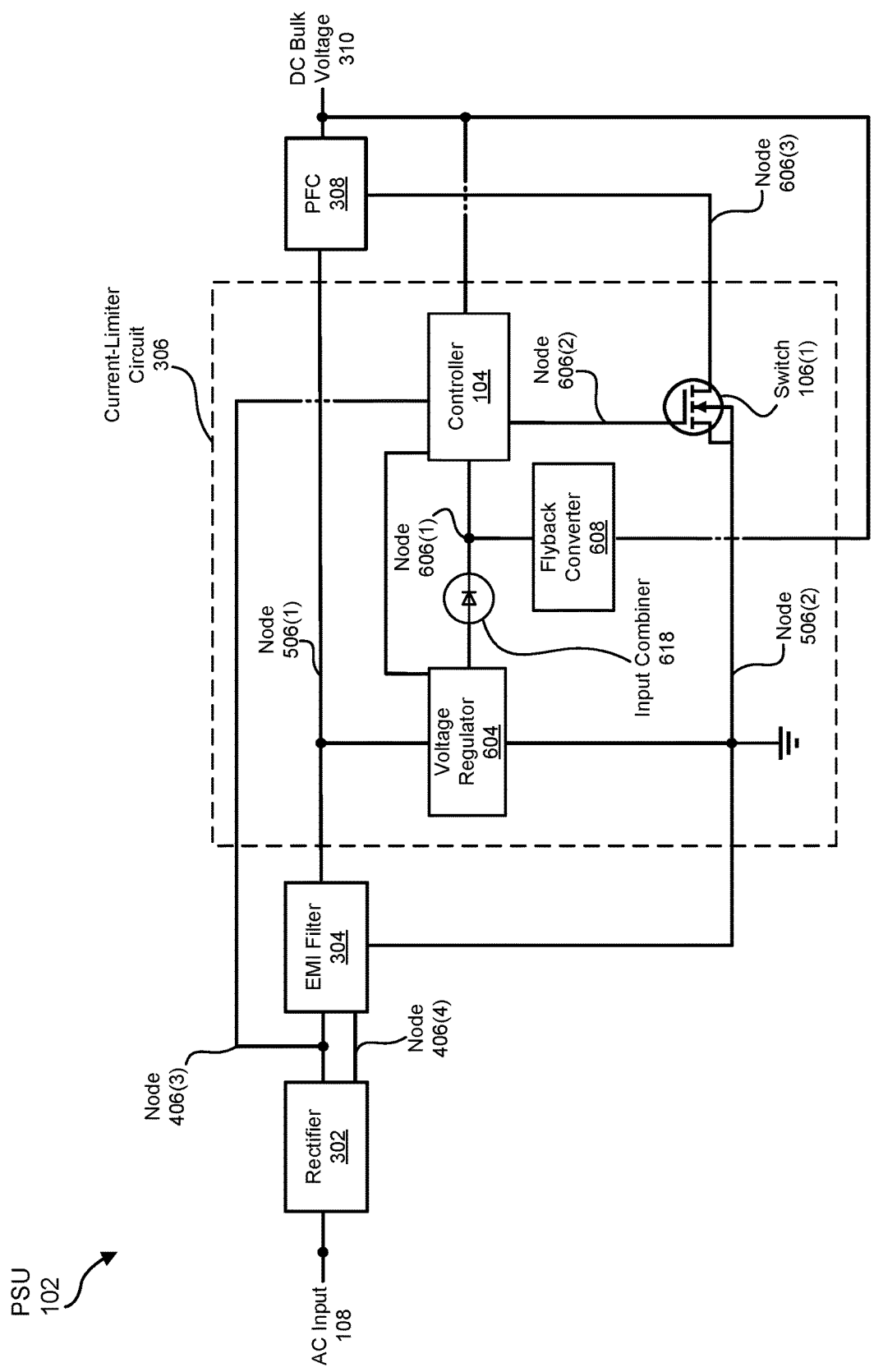
FIG. 6 is a block diagram of an exemplary PSU capable of limiting inrush current according to one or more embodiments of this disclosure.

FIG. 6 illustrates a portion of an exemplary implementation of PSU 102 capable of limiting inrush current in conjunction with controller 104. In some examples, PSU 102 in FIG. 6 may include and/or represent certain components, configurations, and/or features that perform and/or provide functionalities that are similar and/or identical to those described above in connection with any of FIGS. 1-5. As illustrated in FIG. 6, exemplary PSU 102 may include and/or represent rectifier 302, EMI filter 304, current-limiter circuit 306, and/or PFC 308.

In some examples, current-limiter circuit 306 may include and/or represent a voltage regulator 604 (e.g., an LDO regulator), a flyback converter 608, an input combiner 618 (e.g., a diode), and/or switch 106(1). Alternatively, one or more of these devices and/or components may be included in PSU 102 but be excluded from current-limiter circuit 306. In one example, one terminal (e.g., a positive voltage input) of voltage regulator 604 may be electrically coupled to EMI filter 304 at node 506(1), and another terminal (e.g., a ground input) of voltage regulator 604 may be electrically coupled to electrical ground 516 at a node 506(2). In this example, an additional terminal (e.g., a voltage output) of voltage regulator 604 may be electrically coupled to one terminal of input combiner 618.

In some examples, input combiner 618 may be configured and/or applied to facilitate selectively drawing electric current for DC bulk voltage 310 from either voltage regulator 604 or flyback converter 608. In one example, input combiner 618 may include and/or represent an OR-ing device and/or a diode whose anode is electrically coupled to the output of voltage regulator 604 and/or whose cathode is electrically coupled to one terminal of flyback converter 608 and/or one terminal of controller 104 at a node 606(1). In this example, when inrush-protection module is implemented, electric current may flow and/or be drawn from AC input 108 to DC bulk voltage 310 and/or DC output 110 via voltage regulator 604. Additionally or alternatively, when normal-operation mode is implemented, electric current may flow and/or be drawn from AC input 108 to DC bulk voltage 310 and/or DC output 110 via flyback converter 608.

In some examples, one terminal of flyback converter 608 may be electrically coupled to one terminal (e.g., a cathode) of input combiner 618 and/or one terminal (e.g., an input) of controller 104 at node 606(1). In one example, another terminal of flyback converter 608 may be electrically coupled to DC bulk voltage 310. Additionally or alternatively, switch 106(1) may include and/or represent an n-type metal-oxide-semiconductor (NMOS) transistor whose source is electrically coupled to electrical ground 516 via node 506(2), whose drain is electrically coupled to one terminal of PFC 308 at a node 606(3), and/or whose gate is electrically coupled to controller 104 at a node 606(2).

In certain examples, controller 104 may be communicatively and/or electrically coupled to node 406(3) to monitor and/or sense the rectified AC voltage outputted by rectifier 302. In some examples, controller 104 may be communicatively and/or electrically coupled to voltage regulator 604 to facilitate enabling and/or disabling voltage regulator 604 (e.g., via an enable pin) depending on whether inrush-protection mode and/or normal-operation mode is implemented. In one example, controller 104 may be communicatively and/or electrically coupled to DC bulk voltage 310 and/or DC output 110 to monitor and/or sense the corresponding voltage level(s). Additionally or alternatively, controller 104 may be communicatively and/or electrically coupled to one or more of switches 106(1)-(N) to facilitate activating and/or deactivating the same in accordance with normal-operation mode and/or inrush-protection mode.

Figure 7:
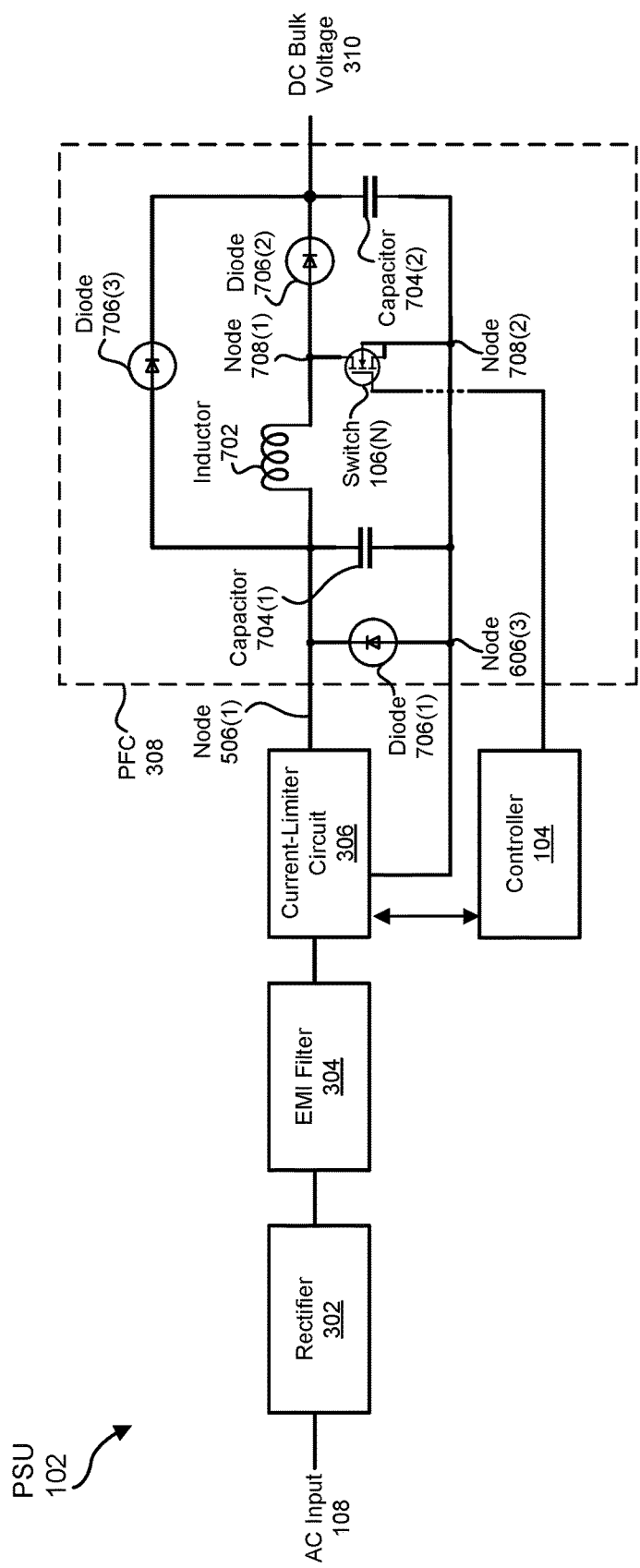
FIG. 7 is a block diagram of an exemplary PSU capable of limiting inrush current according to one or more embodiments of this disclosure.

FIG. 7 illustrates a portion of an exemplary implementation of PSU 102 capable of limiting inrush current in conjunction with controller 104. In some examples, PSU 102 in FIG. 7 may include and/or represent certain components, configurations, and/or features that perform and/or provide functionalities that are similar and/or identical to those described above in connection with any of FIGS. 1-6. As illustrated in FIG. 7, exemplary PSU 102 may include and/or represent rectifier 302, EMI filter 304, current-limiter circuit 306, and/or PFC 308.

In some examples, PFC 308 may include and/or represent switch 106(N), diodes 706(1), 706(2), and 706(3), capacitors 704(1) and 704(2), and/or inductor 702. In one example, diode 706(1) and capacitor 704(1) may be electrically coupled between nodes 506(1) and 606(3). In this example, diode 706(1) may be configured and/or applied to prevent any over voltage spikes appearing on node 506(1) due to the switching action of switch 106(1) by controller 104. Although illustrated as being incorporated in PFC 308 in FIG. 7, diode 706(1) and/or capacitor 704(1) may alternatively be incorporated in current-limiter circuit 306.

In some examples, capacitor 704(2) may include and/or represent the bulk capacitor of PFC 308 and/or PSU 102. In one example, inductor 702 may be electrically coupled between node 506(1) and a node 708(1) at which one terminal (e.g., the anode) of diode 706(2) and/or one terminal of switch 106(N) are joined. In one example, switch 106(N) may include and/or represent an NMOS transistor whose source is electrically coupled to node 708(2), whose drain is electrically coupled to node 708(1), and/or whose gate is electrically coupled to one terminal (e.g., an output) of controller 104.

In some examples, diode 706(3) may be electrically coupled between node 506(1) and DC bulk voltage 310. In one example, diode 706(2) may be electrically coupled between node 708(1) and DC bulk voltage 310. In this example, capacitor 704(2) may be electrically coupled between DC bulk voltage 310 and node 708(2).

In some examples, the various apparatuses, devices, and/or systems described in connection with FIGS. 1-7 may include and/or represent one or more additional circuits, components, and/or features that are not necessarily illustrated and/or labeled in FIGS. 1-7. For example, apparatus 100, system 200, and/or PSU 102 may also include and/or represent additional analog and/or digital circuitry, onboard logic, transistors, antennas, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support limiting inrush current. In certain implementations, one or more of these additional circuits, components, and/or features may be inserted and/or applied between any of the existing circuits, components, and/or features illustrated in FIGS. 1-7 consistent with the aims and/or objectives described herein. Accordingly, the electrical and/or communicative couplings described with reference to FIGS. 1-7 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 8:
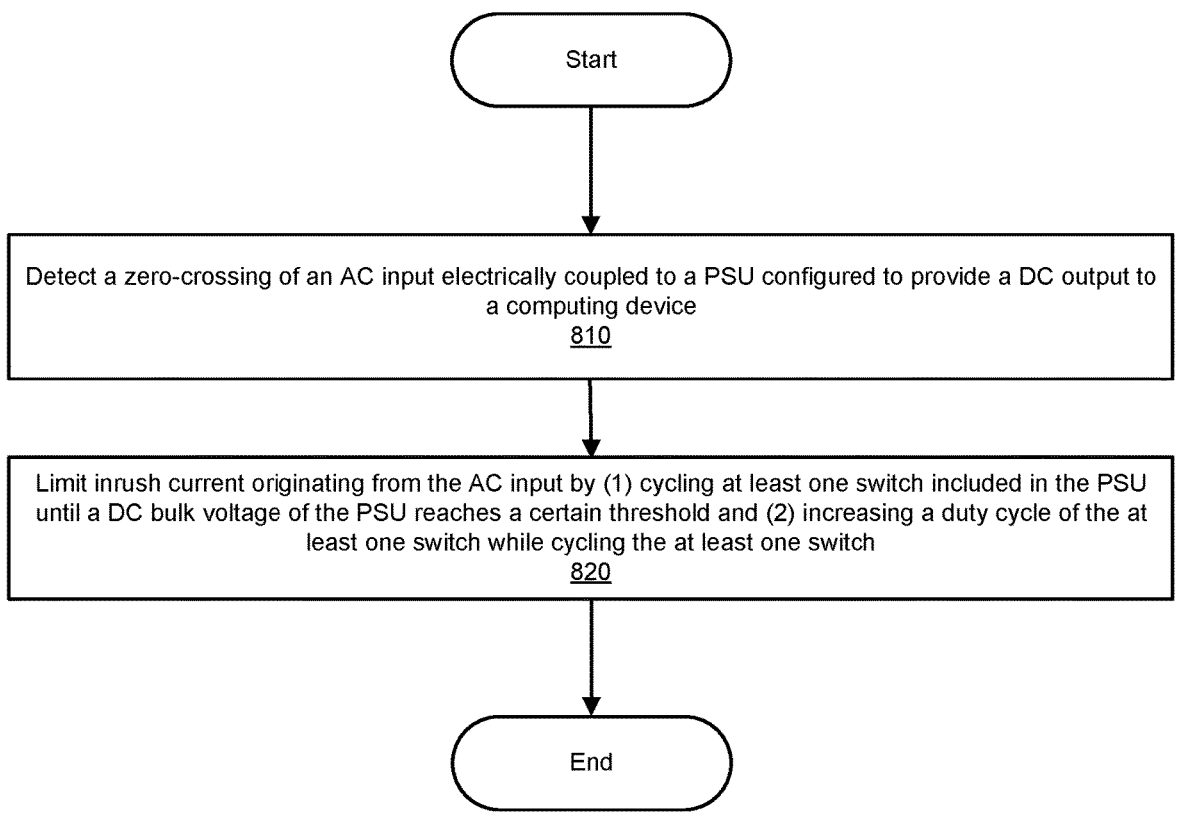
FIG. 8 is a flow diagram of an exemplary method for protecting PSUs from damage by limiting inrush current according to one or more embodiments of this disclosure.

FIG. 8 is a flow diagram of an exemplary method 800 for protecting PSUs from damage by limiting inrush current. In one example, the steps shown in FIG. 8 may be performed by a controller incorporated into and/or associated with a computing device powered by a PSU. Additionally or alternatively, the steps shown in FIG. 8 may incorporate and/or involve certain sub-steps and/or variations consistent with the descriptions provided above in connection with FIGS. 1-7.

As illustrated in FIG. 8, method 800 may include and/or involve the step of detecting a zero-crossing of an AC input electrically coupled to a PSU configured to provide a DC output to a computing device (810). Step 810 may be performed in a variety of ways, including any of those described above in connection with FIGS. 1-7. For example, a controller may detect a zero-crossing of an AC input electrically coupled to a PSU configured to provide a DC output to a computing device.

Method 800 may also include and/or involve the step of limiting inrush current originating from the AC input (820). Step 820 may be performed in a variety of ways, including any of those described above in connection with FIGS. 1-7. In some examples, step 820 may include and/or represent multiple sub-steps for limiting inrush current from the AC input. For example, the controller may limit inrush current originating from the AC input by (1) cycling at least one switch included in the PSU until a DC bulk voltage of the PSU reaches a certain threshold and (2) increasing a duty cycle of the at least one switch while cycling the at least one switch.

In some examples, one or more of the exemplary embodiments disclosed herein may be encoded as a computer program (also referred to as computer software, software applications, computer-readable instructions, and/or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a power supply unit (PSU) configured to:
convert power from an alternating current (AC) input into a direct current (DC) output; and
provide the DC output to a computing device; and
a controller configured to limit inrush current originating from the AC input by:
cycling at least one switch included in the PSU until a DC bulk voltage of the PSU reaches a certain threshold;
maintaining a first duty cycle of the at least one switch for a first plurality of cycles; and
upon completion of the first plurality of cycles, applying a second duty cycle to the at least one switch for a second plurality of cycles, wherein the second duty cycle is greater than the first duty cycle.

2. The apparatus of claim 1, wherein the controller is further configured to cycle the at least one switch by:
detecting a zero-crossing of the AC input; and
in response to detecting the zero-crossing of the AC input:
activating the at least one switch for a certain amount of time; and
upon completion of the certain amount of time, deactivating the at least one switch.

3. The apparatus of claim 2, wherein the controller is further configured to cycle the at least one switch by:
detecting an additional zero-crossing of the AC input; and
in response to detecting the additional zero-crossing of the AC input:
activating the at least one switch for the certain amount of time; and
upon completion of the certain amount of time, deactivating the at least one switch.

4. The apparatus of claim 1, wherein the controller is further configured to cycle the at least one switch by alternating the at least one switch between periods of activation and deactivation until the DC bulk voltage reaches the certain threshold.

5. The apparatus of claim 1, wherein the controller is further configured to:
detect that the DC bulk voltage has reached the certain threshold; and
in response to detecting that the DC bulk voltage has reached the certain threshold:
discontinue cycling the at least one switch; and
activate the at least one switch indefinitely.

6. The apparatus of claim 5, wherein the controller is further configured to, in response to detecting that the DC bulk voltage has reached the certain threshold:
deactivate a voltage regulator of the PSU; and
direct the PSU to draw electric current for the DC bulk voltage from a flyback converter of the PSU instead of drawing the electric current for the DC bulk voltage from the voltage regulator.

7. The apparatus of claim 1, wherein the certain threshold comprises a voltage level commensurate with a peak voltage of the AC input.

8. The apparatus of claim 1, wherein the at least one switch comprises at least one transistor whose gate is electrically coupled to the controller.

9. The apparatus of claim 1, wherein the PSU comprises a current-limiter circuit that includes:
a voltage regulator;
a flyback converter; and
an input combiner configured to facilitate selectively drawing electric current for the DC bulk voltage from the voltage regulator or the flyback converter.

10. The apparatus of claim 9, wherein the current-limiter circuit further includes the at least one switch.

11. The apparatus of claim 10, wherein:
the at least one switch is electrically coupled between a first node of the current-limiter circuit and a second node of the current-limiter circuit; and
the current-limiter circuit further includes a diode that prevents any over voltage spikes appearing on a third node of the current-limiter circuit with reference to the second node.

12. The apparatus of claim 1, wherein the second plurality of cycles is less than the first plurality of cycles.

13. The apparatus of claim 11, wherein:
the first node comprises an electrical ground;
the second node electrically couples the at least one switch to a bulk capacitor; and
the third node comprises a rectified derivative of the AC input that is electrically coupled to the voltage regulator.

14. A system comprising:
a computing device;
a power supply unit (PSU) configured to:
convert power from an alternating current (AC) input into a direct current (DC) output; and
provide the DC output to the computing device; and
a controller configured to limit inrush current originating from the AC input by:
cycling at least one switch included in the PSU until a DC bulk voltage of the PSU reaches a certain threshold;
maintaining a first duty cycle of the at least one switch for a first plurality of cycles; and
upon completion of the first plurality of cycles, applying a second duty cycle to the at least one switch for a second plurality of cycles, wherein the second duty cycle is greater than the first duty cycle.

15. The system of claim 14, wherein the controller is further configured to cycle the at least one switch by:
detecting a zero-crossing of the AC input; and
in response to detecting the zero-crossing of the AC input:
activating the at least one switch for a certain amount of time; and
upon completion of the certain amount of time, deactivating the at least one switch.

16. The system of claim 15, wherein the controller is further configured to cycle the at least one switch by:
detecting an additional zero-crossing of the AC input; and
in response to detecting the additional zero-crossing of the AC input:

activating the at least one switch for the certain amount of time; and upon completion of the certain amount of time, deactivating the at least one switch.

17. A method comprising:

detecting, by a controller, a zero-crossing of an alternating current (AC) input electrically coupled to a power supply unit (PSU) configured to provide a direct current (DC) output to a computing device; and limiting, by the controller, inrush current originating from the AC input by:

cycling at least one switch included in the PSU until a DC bulk voltage of the PSU reaches a certain threshold;

maintaining a first duty cycle of the at least one switch for a first plurality of cycles; and upon completion of the first plurality of cycles, applying a second duty cycle to the at least one switch for a second plurality of cycles, wherein the second duty cycle is greater than the first duty cycle.

* * * * *